United States Patent [19]

Baumann

[11] Patent Number: 5,141,370
[45] Date of Patent: Aug. 25, 1992

[54] HIGH PRECISION TOOL HOLDER

[75] Inventor: David C. Baumann, Lafayette, N.Y.

[73] Assignee: Carrier Corporation, Syracuse, N.Y.

[21] Appl. No.: 624,151

[22] Filed: Dec. 6, 1990

[51] Int. Cl.$^5$ .................. B23B 31/30; B23C 5/26
[52] U.S. Cl. .................. 409/232; 279/2.08; 408/239 R
[58] Field of Search .............. 409/231, 232, 233, 234; 279/4, 2 A, 2.08; 408/239, 239 A, 240; 51/168; 83/666, 676

[56] References Cited

U.S. PATENT DOCUMENTS

| | | | |
|---|---|---|---|
| 3,516,328 | 6/1970 | Jones et al. ........................ | 409/231 |
| 3,516,681 | 6/1970 | Cox et al. ......................... | 279/4 |
| 3,592,482 | 7/1971 | Better et al. ...................... | 279/4 |
| 3,663,027 | 5/1972 | Klipping ........................... | 279/4 |
| 3,830,509 | 8/1974 | Weber ............................. | 279/4 |
| 4,801,227 | 1/1989 | Glimpel et al. .................... | 409/234 |

FOREIGN PATENT DOCUMENTS 3721521   1/1989   Fed. Rep. of Germany ...... 409/234

*Primary Examiner*—Z. R. Bilinsky

[57] ABSTRACT

A quill is rotated in a spindle and carries a tool which is rotated with the quill about a common axis. The tool is held in a bore in the quill by a gland or sleeve that forms a portion of the bore and is expanded into contact with the tool by hydraulic pressure produced by one or more threaded pistons acting on a closed volume.

2 Claims, 1 Drawing Sheet

HIGH PRECISION TOOL HOLDER

BACKGROUND OF THE INVENTION

The key to any high precision machining operation using a single or multi-fluted rotary tool is to achieve the lowest radial runout and axial deviation from the center line that is possible. Current spindle designs use a tapered device, a collect device or a straight device with a very close fit in an attempt to achieve the desired accuracy. Each of these arrangements require high precision parts relative to their tapers, clearances etc. These spindle designs retain the tool by: 1) a collect; 2) a draw bar which may be either threaded or of an automatic tool changer type; or, 3) threads and jam nuts. These designs have many pieces which results in the stacking up of tolerances/inaccuracies, there are problems with draw bar balancing, and there are high costs. These designs produce many points in the system with a potential for producing cumulative radial runout and axial deviation. They are, for example, the location of the spindle, the location of the tool holding device in the spindle and the location of the tool in the tool holding device.

SUMMARY OF THE INVENTION

A direct interface is provided between the spindle and the cutting tool. In order to hold the tool without using a separate tool holder, a continuous pocket and sleeve are manufactured into the spindle. The sleeve must be precisely located in the spindle either by machining or fit. The pocket is filled with oil and confined with one or more screws located so as to be capable of being advanced into and withdrawn from the confined oil. Upon advancing the screw, the oil is compressed and acts to expand the sleeve and thereby firmly hold the tool located within the sleeve and thereby in the spindle. This achieves the smallest possible radial runout and axial deviation short of fixing a tool permanently to the spindle or shrink fitting the tool into the spindle. This arrangement also eliminates the need for a draw bar assembly to hold the tool and the associated problems with the balancing of the spindle as well as added cost.

It is an object of this invention to provide precision tool holding capabilities.

It is another object of this invention to minimize radial runout and axial deviation. These objects, and others as will become apparent hereinafter, are accomplished by the present invention.

Basically, a direct interface is provided between a spindle and a cutting tool. The tool is secured in place through hydraulic pressure expanding a precisely located sleeve in the spindle into engagement with the tool. The sleeve is either formed or fit in the spindle.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
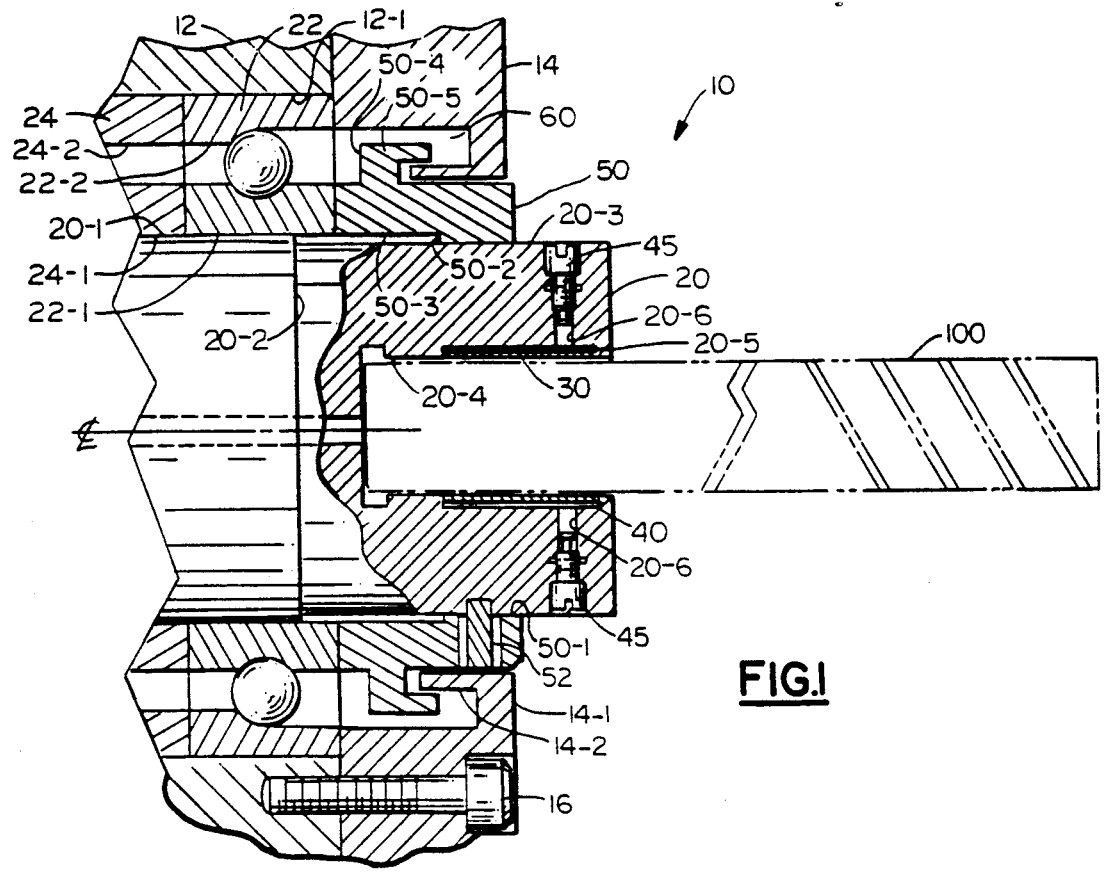
FIG. 1 is a partial partially sectioned view of a spindle and cutting tool.

In FIG. 1, the numeral 10 generally designates a spindle for accurately holding cutting tool 100. Spindle 10 includes a spindle body 12 and a spindle cover and preload assist 14 which is secured to spindle body 12 by bolts 16 which provide a preload bias. Body 12 has a bore 12-1 which receives rolling element bearing 22, spacer 24 and another rolling element bearing (not illustrated) which collectively form a continuous bore including portions 22-1 and 24-1 which receive and support quill 20. Quill 20 has a first portion 20-1 which coacts with bores 22-1 and 24-1 and a second, smaller portion 20-3 separated from the first portion by shoulder 20-2. Bore 20-4 is located in portion 20-3 and is coaxial with quill 20. Bore 20-4 is partially defined by expansion gland 30. Gland 30 is surrounded by annularly spaced bore or recess 20-5 and coacts therewith to define oil galley 40 which appears as an annular cylinder in FIG. 2. Gland or sleeve 30 is precisely located so as to form a portion of bore 20-4 and may be machined in quill 20 or formed as a separate part which is located in a portion of the recess 20-5 defining oil galley 40. Radially extending bores 20-6 are in fluid communication with oil galley 40 and threadably receive screw adjusted pistons 45. Seal 50 has a first bore portion 50-1 which snugly receives portion 20-3 of quill 20 and a second, larger bore portion 50-3 which is separated from first bore portion 50-1 by shoulder 50-2. Seal 50 further includes a radially extending annular portion 50-4 and an axially extending annular portion 50-5.

Spindle cover and preload assist 14 has a radially extending annular portion 14-1 and an axially extending annular portion 14-2 which in the assembled spindle 10 is located axially inward and partially axially coextensive with axially extending annular portion 50-5. Axially extending annular portions 14-2 and 50-5 are in an annular chamber 60 which is supplied with lubricating oil via the bore in the other rolling element bearing (not illustrated) and bores 24-2 and 22-2 from a lubrication source (not illustrated).

Figure 2:
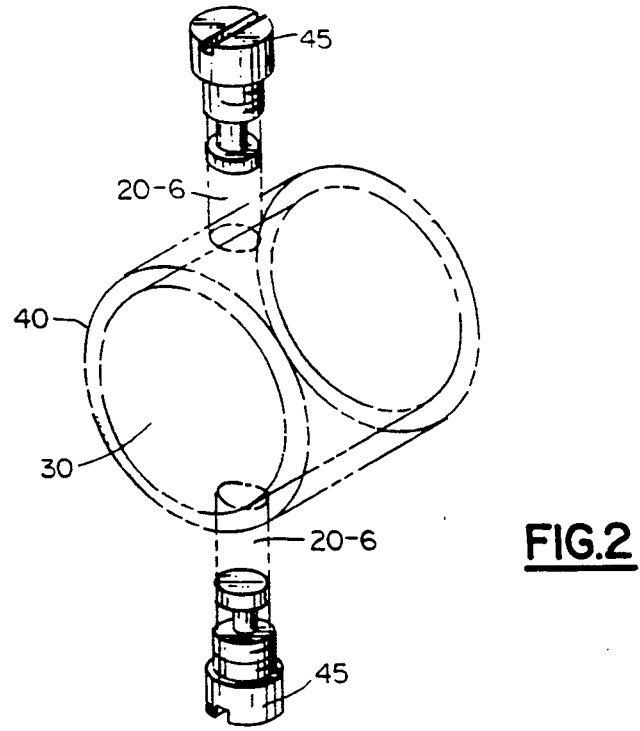
FIG. 2 is a pictorial view of the hydraulic structure.

Referring now to FIG. 2, it will be noted that oil galley 40 is of an annular configuration and is in fluid communication with radially extending bores 20-6. Galley 40 and bores 20-6 contain oil in a contained volume whose size and pressure is adjusted by way of advancing and retracting screw adjusting pistons 45. Specifically, the advancing of one or more of the screw adjusting pistons 45 into bores 20-6 tends to reduce the contained volume and increase the pressure of the oil contained therein. Other than screw adjusting pistons 45, the only structure defining the contained volume that is capable of movement is the gland or sleeve 30 which defines the inner annular portion of oil galley 40. So, responsive to an increase in pressure in the oil galley 40, the gland 30 will tend to flex radially inward and reduce the inner diameter of gland 30.

In operation, seal 50 will be located on portion 20-3 of quill 20 and together with bearing 22, spacer 24 and the bearing (not illustrated) will be held in place by spindle cover and preload assist 14 and bolts 16. Screw adjusting piston(s) 45 will be backed off to bring the pressure in the confined volume defined by oil galley 40 and bores 20-6 to ambient or less to permit gland 30 to move to its unstressed condition. Tool 100 would then be placed in bore 20-4 as illustrated in FIG. 1. The screw adjusting pistons 45 would then be advanced to increase the pressure in the oil galley 40 causing gland 30 to collapse radially inwardly into contact with tool 100. Because gland 30 and the portion of tool 100 engaged thereby are cylindrical, the entire circumference of tool 100 is engaged for essentially the entire length of gland 30 with a uniform pressure because oil galley 40 is cylindrical, and this minimizes potential error between the spindle 12 and tool 100. To machine with tool 100, quill 20 is rotated in bore 12-1 by a motor (not illustrated) and quill 20, seal 50 and tool 100 rotate about a common axis. Oil is supplied to annular chamber 60 via the oil passage defined by bores 24-2 and 22-2 and lubricates seal 50 with a portion of the oil passing between annular axial extension 14-2 and seal 50.

Although a preferred embodiment of the present invention has been illustrated and described, other changes will occur to those skilled in the art. It is therefore intended that the present invention is to be limited only by the scope of the appended claims.

What is claimed is:

1. A high precision tool holder comprising:
   a spindle means having an axial bore therein;
   a quill means located in said ore in said spindle means so as to be rotatable therein;
   a cylindrical, axial bore in said quill means for receiving and fixedly holding a solid, cylindrical portion of a tool;
   said cylindrical axial bore in said quill means is at least partially defined by gland means which are hydraulically actuated for radial movement for selectively securing and releasing said tool in said cylindrical bore whereby said quill means and said tool are rotatable as a unit when said tool is fixedly held in said cylindrical axial bore.

2. The tool holder of claim 1 wherein said gland means are hydraulically actuated by mans of piston means acting on a trapped volume.

* * * * *